US008851812B1

(12) United States Patent
DeRosa

(10) Patent No.: US 8,851,812 B1
(45) Date of Patent: Oct. 7, 2014

(54) QUICK CHANGE POWER TOOL CHUCK

(76) Inventor: John L. DeRosa, Upper Marlboro, MD (US)

(*) Notice: Subject to any disclaimer, the term of this patent is extended or adjusted under 35 U.S.C. 154(b) by 1055 days.

(21) Appl. No.: 12/804,609

(22) Filed: Jul. 26, 2010

Related U.S. Application Data

(63) Continuation-in-part of application No. 11/074,744, filed on Mar. 9, 2005, now Pat. No. 7,766,586, which is a continuation-in-part of application No. 10/347,591, filed on Jan. 22, 2003, now Pat. No. 6,880,832.

(60) Provisional application No. 60/432,638, filed on Dec. 12, 2002.

(51) Int. Cl.
B23B 31/02 (2006.01)

(52) U.S. Cl.
USPC ............ 409/234; 409/232; 279/43.1; 279/44; 279/67; 279/103

(58) Field of Classification Search
USPC ............ 409/232, 234; 279/33–35, 43.1–43.3, 279/44–45, 67, 77, 103; 408/238–240
IPC ................. B23B 31/103,31/117, 31/20
See application file for complete search history.

(56) References Cited

U.S. PATENT DOCUMENTS

| 646,489 | A | * | 4/1900 | Cook | 279/81 |
| 799,787 | A | * | 9/1905 | Gessert | 279/77 |
| 2,482,603 | A | * | 9/1949 | Toth | 279/45 |
| 2,860,883 | A | * | 11/1958 | Better et al. | 279/83 |
| 2,894,759 | A | * | 7/1959 | De Bruin | 279/97 |
| 3,139,296 | A | * | 6/1964 | Greene | 403/373 |
| 3,236,572 | A | * | 2/1966 | White, Sr. | 384/541 |
| 3,281,170 | A | * | 10/1966 | Kaplan | 403/373 |
| 3,917,424 | A | * | 11/1975 | Zugel | 403/287 |
| 4,176,991 | A | * | 12/1979 | Egli | 408/239 R |
| 4,211,510 | A | * | 7/1980 | Hopkins | 408/186 |
| 5,306,096 | A | * | 4/1994 | Tuns et al. | 403/344 |
| 5,716,056 | A | * | 2/1998 | Bokram | 279/46.2 |
| 5,851,084 | A | * | 12/1998 | Nishikawa | 403/344 |
| 6,880,832 | B2 | * | 4/2005 | DeRosa | 279/44 |
| 6,908,264 | B1 | * | 6/2005 | Gundy | 408/204 |
| 7,766,586 | B2 | * | 8/2010 | DeRosa | 409/232 |
| 2006/0048615 | A1 | * | 3/2006 | Treige | 82/158 |

* cited by examiner

Primary Examiner — Daniel Howell
(74) Attorney, Agent, or Firm — Neil F. Markva

(57) ABSTRACT

A chuck device for holding an unmodified, circumferentially round tool shaft or collet includes an annular head portion having a distal end surface, a laterally spaced coupling end section, an outer circumferential surface, and a central longitudinally extending bore with an inner circumferential bore surface to slidingly receive the tool shaft or collet with the tool axis aligned collinearly with the bore axis. The head portion includes a first slot extending inwardly on one side of the annular head and normal to the distal end surface, and a second slot extending from the outer circumferential surface normal to and intersecting the first slot to form stationary and pivotable segments having a bore-facing, tool grasping surface that radially directs a compressive grasping force in an amount sufficient to hold the tool with a slip-torque of up to about 430 inch-lbs. at a rotational speed of up to at least about 20,000 rpm.

20 Claims, 10 Drawing Sheets

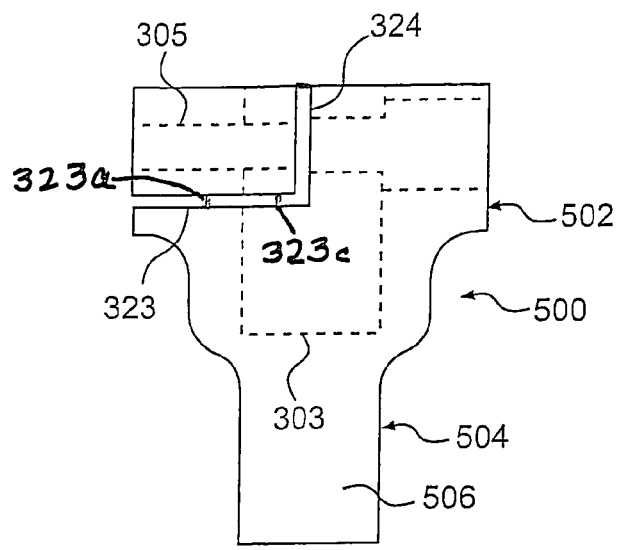
FIG. 5
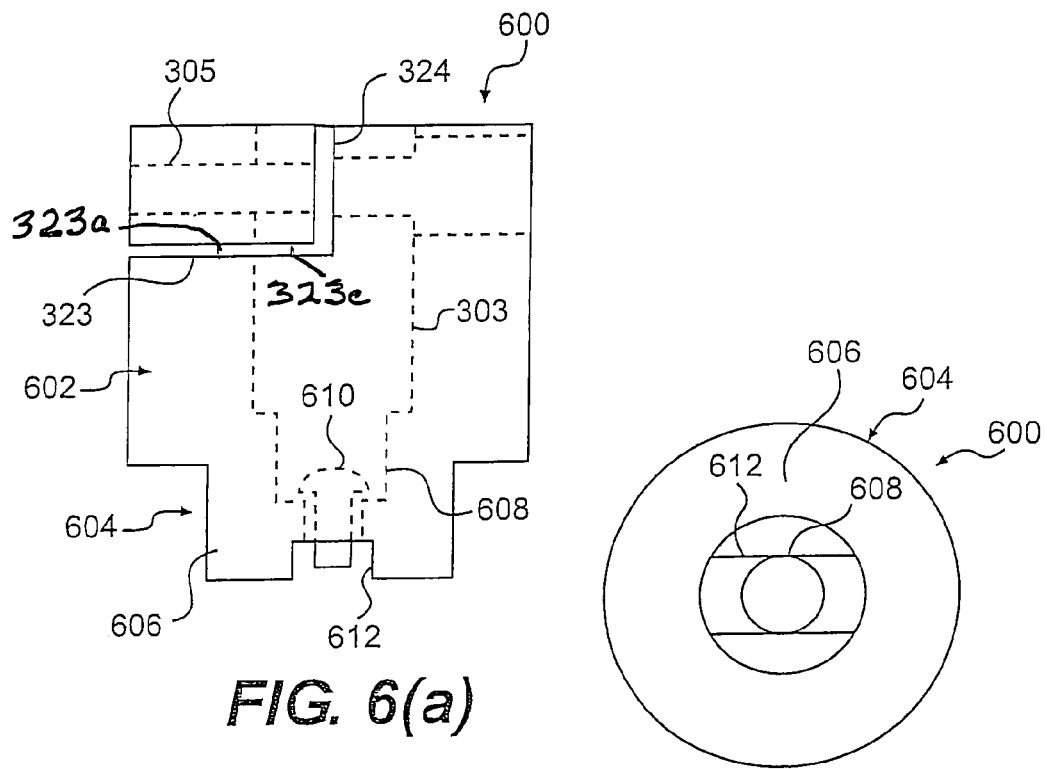
FIG. 6(a)
FIG. 6(b)

QUICK CHANGE POWER TOOL CHUCK

RELATED APPLICATIONS

This application is a Continuation-In-Part of application Ser. No. 11/074,744 filed Mar. 9, 2005 now U.S. Pat. No. 7,766,586, which is a Continuation-In-Part of application Ser. No. 10/347,591 filed on Jan. 22, 2003, now U.S. Pat. No. 6,880,832 issued Apr. 19, 2005, which itself claims benefit of the filing date of Provisional Patent Application No. 60/432,638, filed on Dec. 12, 2002.

BACKGROUND OF THE INVENTION

1. Field of the Invention

The present invention relates to quick change chucks for power tools and, more particularly, to a new chuck that provides a significantly increased holding force without sacrificing ease of tool changing.

2. Discussion of Related Art

Although there are a number of existing chucks and like devices for retaining cutting bits in power tools and driven spindles, they all have some disadvantages which detract from their advantages. For example, while some chucks hold the cutting tool with enough force that slippage will not occur, the changing of the tool can be very cumbersome and time consuming. Others allow an easy changing of tools but do not provide enough holding torque to prevent slippage from occurring. There are a few chucks that allow easy changing of tools and also provide a reasonable amount of holding torque. However, at the present time, there are no chucks currently available which allow an easy change of the cutting tool and which also provide the increase in mechanical advantage in an amount sufficient to effect a compressive force along a circumferential surface of a tool shank or collet to substantially increase the holding torque. A chuck of this type would allow the power tool user to spin much larger cutting tools at higher speeds while still maintaining a substantially greater safety margin because of the increased holding force.

One chuck of particular interest here is that disclosed in U.S. Pat. No. 5,096,212 to Walsh. Although this chuck has advantages, there are several disadvantages to the chuck. By way of background, it is noted that routers are required to spin the cutting bit at a relatively high angular speed, typically above 20,000 rpm. Thus, the design of a router chuck has to be as lightweight and compact as possible for obvious reasons. Accordingly, if the chuck is relatively heavy and bulky in size as in the case of the chuck of the Walsh patent, unwanted and sometimes severe vibration can occur, resulting in an unsafe operating condition. Further, the chuck of the Walsh patent requires two cams which secure the tool essentially by pinching the tool shaft. Since the cams are harder than the typical tool shaft, an unwanted indentation in the tool shaft can result if the cams are over-tightened. Another disadvantage of the Walsh chuck is that the manner in which the nut is attached to the body is inadequate. In this regard, although during the short time a chuck constructed as disclosed in the Walsh patent was distributed no failures were reported, the construction could have eventually led to catastrophic failure. Finally, the construction of the chuck of the Walsh patent employs some unnecessary parts, includes a relatively weak screw, and in general, has the appearance of being cumbersome and awkward to use.

An improvement in the Walsh construction of quick change router chucks and the like is disclosed in U.S. Pat. No. 6,332,619 to DeRosa. The genesis of this construction was an attempt to overcome all, or as many as possible, of the shortcomings of the Walsh chuck. The attempt was successful and the construction of the DeRosa chuck not only incorporates several improvements but has been manufactured and sold in quantity to the general public. One improvement is the use of only a single cam instead of two. The single cam was also modified and is allowed to slightly crush under pressure. However, while the cam maintains its holding power, it does not indent the tool shaft. The nut is attached by the use of retaining rings which are much stronger and safer than the previously used pins. Among other advantages, the size of the chuck was greatly reduced by the elimination of one cam and a few unnecessary internal parts, and a stronger screw was incorporated. However, one disadvantage is that some of the holding power provided by the chuck had to be sacrificed by the use of the softer cam in eliminating the tool shaft indentation problem created by the previous use of a harder cam.

U.S. Pat. No. 4,211,510 ('510) is directed to an adjustable boring tool that includes a shaft having a longitudinal axis, and a cylindrical bore for mounting a cylindrical boring bar that may adjusted to effect the boring diameter of the cutting tool. To effect the boring diameter adjustment, the longitudinal axes of the bore and boring bar are offset a predetermined amount from the longitudinal axis of the shaft, which is offset and allows adjustable radial position of the tool cutting point. A transverse slot extends to the center line of the cylindrical bore and intersects a diagonal slot that extends in the plane of the longitudinal sectional view and terminates along a diagonal line to define two split quadrant bore half segments that both are deflected to force the bar into clamped engagement between the wall segments. A transverse clamp screw on one side of the bore tightens the quadrant wall segments while the boring bar is in an adjustable position within the cylindrical bore and clamps the slotted segments against the boring bar. A graduated dial fixed to the boring bar permits an accurate, calibrated adjustment of the effective diameter of the cutting point through rotation of the boring bar, when not clamped in place, over a range equal to four times the offset. The spindle mounting shafts shown in the drawings of the '510 patent are commonly used and may be mounted in a standard milling machine. At rotational routing tool speeds of up to more than at least about 20,000 rpm, and in a range of from about 8,000 to 25,000 rpm as used in the current invention, the required offset axes of the '510 patent would cause vibration of the tool that would make it unusable and unsafe as a routing tool holder.

U.S. Pat. No. 6,908,264 ('264) is directed to a specially modified quick-change core drill that is not attached to the drill motor in the standard way by the use of threads. It is not a chuck, but is a modified hole or circular saw that does not contain the usual mounting threads at one end. Instead, the modified core drill contains an L-shaped channel formed by a pair of slots that allow the modified core drill to be locked into an adapter with a locating stop. Since both ends of the modified core drill are open, the removal of the core after drilling becomes very easy. In a core drill application, the threads on the drill motor absorb all of the tangential loading and the front bearing in the drill motor absorbs all of the axial load thereby acting as a thrust bearing. This is the way standard core drills are commonly attached to slow speed, high torque core drill motors. The adapter comprises a first end adapted to be removably connected to the drill motor, and a second end adapted to be removably connected to a modified core drill.

Core drilling of the '264 patent, whether using a diamond or carbide core drill, is accomplished at very slow rotational speeds (50-1000 rpm) in order not to destroy the cutting edges of the core drill. However, an increased length to any given diameter is characteristic of a typical core drill. If the standard rotational speed of the core drill motor is increased to a much higher value, the cutting edges on the core drill would become damaged, and vibration would begin and become increasingly apparent as the rotational speed is further increased. Thus making the mechanical configuration of the drill and adapter unstable and usable at typical routing tool speeds.

Although the '264 patent slots 32 and 34 along with screw 30 do aid in holding the modified core drill, pin 24 absorbs the major portion of the tangential loading along with the L-shaped slot 19 and 42. This configuration acts as a positive stop in a similar manner as the threads on a standard core drill. This would prevent the modified core drill from slipping in the adapter thereby damaging both the core barrel and adapter in the event of a jam, which is common in core drilling. Upon detection of a jammed core inside the core drill barrel, the '264 patent device user can quickly and easily remove the jammed core from the drill barrel by disconnecting the modified core drill from the adapter. Since there are no obstructions present, the user can simply remove the jammed core from the first end of the core drill barrel.

The '264 device also requires a modified core drill to function with the adapter, which will not receive a stock core drill. Since core drills come in many lengths and diameters, a modified core drill barrel has to be manufactured for each diameter and length. Depending on the required depth of cut, the core drill and adapter have to be of a different diameter and/or length for the adapter to maintain axial stability of the core drill. Moreover, core drills usually require long lengths with respect to their diameter because of their intended application. Such a configuration has an increase bending moment and is, therefore, prone to vibration or instability at elevated rotational speeds.

In a routing application, the ratio of the axial length of the chuck divided by its outside body diameter should be held to the lowest value as practical (short and fat) to minimize vibration at high speeds. The ratio of the minimum axial length of my chuck divided by the diameter of its bore should be no less than at least 2 to 1 to maintain adequate stability and gripping force at high speeds. However, in a core drill application, the adapter of the modified '264 patent core drill requires a ratio of its axial length divided by its outside diameter to be large (tall and thin), thus giving it stability for operating the core drill at higher axial loads at lower speeds. This is opposite to what is required in a router application making the two applications completely different from each other so that their respective operating principles are not interchangeable.

Excessive spindle speed for axially loaded tools will cause premature tool wear, breakages, and can cause tool chatter, all of which can lead to potentially dangerous operating conditions. In contrast to the prior art related to adjustable boring tools discussed hereinabove, alignment of router chucks, routing tools, and coupling parts used to attach chucks to router spindles is critical to avoid failure due to vibration at the high rotational speeds required for routing materials.

Axial feed rates for prior art core drilling devices are very low (0.1 to 4 inches per minute), the axial loads are very high and the drill has to be able to produce a very high torque. Such prior art devices may be manufactured with loose tolerances in their threaded connections and axial offsets of their tool with respect to their coupling mechanisms because of their slower rotational speeds compared those used in routing operations.

Very high router feed rates produce loads that are laterally induced normal to the longitudinal axis of a router tool, and are thus opposite to the axial loads induced parallel to the longitudinal axis of a core drill tool. High router rotational speeds reduce the load per tooth on the router cutting tool and reduces chatter that is caused by the tool bouncing on and off the workpiece due to high rotational speed and/or feed rate. For these reasons, nothing in the prior art mechanical structures dealing with axial loads suggests to a person ordinarily skilled in the routing art how to deal with solving problems related to primarily laterally induced loads on cutting tools.

PURPOSE OF THE INVENTION

An object of the present invention provides a chuck having greatly increased holding torque, without relying on set screws, flats, keys or any other such elements or configurations that are conventionally used to prevent rotational slippage between the cutting tool and chuck.

A primary object of the invention provides a router chuck that uses tension force to apply a circumferential compressive force along the outer circumferential surface of an unmodified, round tool shaft for holding the shaft within a central bore of my chuck body.

Another object of the invention incorporates a pivotable annular segment having a generally U-shaped inner, gripping surface for applying a compression gripping force along the circumference of an unmodified, round tool shaft disposed in a central bore of a chuck body.

A further object of the invention collinearly aligns longitudinal axes of an unmodified tool shaft and a central bore of a chuck to allow a rotational speed of the tool up to more than at least 20,000 rpm without any chatter.

Still another object of the invention provides a chuck including a first slot in a plane extending to the bore axis of a chuck, a second slot extending in a plane normal to the bore axis intersecting the first slot, and the second slot having a fixed end on the outer chuck surface at a circumferential angle location in a range of about 130° to about 160° from the center of the first slot.

A further object of the invention provides a first slot in a plane that extends inwardly from a distal end surface of my chuck head parallel to the bore axis for a distance greater than one-half of the distance between the distal end surface and the bottom of my chuck head, and a second slot that extends in a plane normal to the bore axis to intersect the bottom of the first slot.

A still further object of the invention is to provide a chuck with a ratio of its overall, minimum axial length divided by its bore diameter that is no less than at least about 2 to 1 to maintain adequate stability and gripping force at high speeds.

Another object of the invention provides a chuck having a bore that accepts an unmodified tool shaft or collet having a standard diameter in the range of about 0.125 to about 0.750 inch with an overall outside diameter of the chuck in the range of about 1 to about 1.5 inches.

Another object of the invention provides an annular chuck body with a first slot extending in a plane though an inner circumferential bore surface, and a second slot extending in a plane that is normal to the bore axis and intersects the first slot to form a pivotable annular segment having a shaft engaging inner surface that is pivotal about a second slot fixed end that is disposed at a circumferential location of up to about 145° from the center of the first slot.

Still another object of the invention is to provide a router chuck that accepts and holds stock unmodified, round router tool shafts of almost any size diameter with holding power that not only allows larger diameter cutters not to slip at elevated speeds and feeds, but increases the overall safety for the operator.

A further object of the present invention is to preserve the relative ease of bit or tool changing and mounting to the motor tool or spindle that is characteristic of quick change chucks.

Another object of the present invention is to allow the spinning of much larger cutting bits or tools more safely, by providing much stronger holding of the bit or tool.

A further object of the present invention is to greatly increase the holding strength to weight ratio of the chuck in comparison to other existing quick change chucks.

An additional object of the present invention is to eliminate any internal parts used in prior art chucks that can wear out or fail over time and are critical to the operation of prior art chucks, such as cams, plates, and the like.

SUMMARY OF THE INVENTION

The invention is directed to a chuck device for holding a tool having an unmodified, circumferentially round tool shaft or collet. The device comprises a chuck body including an annular head portion having a distal end surface, a laterally spaced coupling end section, an outer circumferential surface, and a central longitudinally extending bore with an inner circumferential bore surface to slidingly receive the tool shaft or collet with the tool axis aligned collinearly with the bore axis.

The head portion includes a first slot extending inwardly on one side of the annular head and normal to the distal end surface, and a second slot extending from the outer circumferential surface normal to and intersecting the first slot to form a stationary segment and a pivotable segment having a bore-facing, tool grasping surface that moves between a rest position and a gripping position whereby the tool grasping surface radially directs a compressive grasping force around the outer circumferential surface of the tool shaft or collet the tool shaft or collet received in the bore.

The second slot is parallel to and laterally spaced a distance from the distal end surface sufficient to allow a threaded aperture to extend into the stationary and pivotable segments, and a tightener member to be threadingly received in the threaded aperture that is tangentially disposed between inner and outer circumferential surfaces of the head portion, and between the distal end surface and the second slot.

The tightener member, when tightened in the threaded aperture, is effective to produce a tension force in an amount sufficient to cause the tool grasping surface to grasp the tool shaft or collet received in the bore with a compressive force in an amount sufficient to hold the tool with a slip-torque of up to about 430 inch-lbs. at a rotational speed of up to at least about 20,000 rpm.

The first slot is located in a first plane that extends parallel to the bore axis from the distal end surface and through one side of the annular end head portion to intersect the inner bore surface and the outer circumferential surface of the head portion. The second slot is located within a second plane that extends normal to the central bore axis. The tightener aperture has a longitudinal axis that extends across the first slot, through the stationary and pivotable segments, and is effective to receive the tightener member having a head at one end thereof and a threaded portion at the distal end thereof to engage an inner threaded portion of at least one of the annular stationary and pivotable segments.

The coupling end section includes connecting means for attaching the chuck device to a router spindle having outer threads and an inner tapered bore surface that converges into the spindle. The connecting means has a tapered inner bore surface that diverges from the head portion to a cylindrical nut portion having inner threads to threadingly engage outer threads of the router spindle. Chuck axis alignment means for disposition between the tapered surfaces of the chuck device and tool spindle end includes a split lock-washer, a collet having two ends and outer tapered surfaces that intersect at an intermediate point between the two ends. The outer tapered surfaces of the collet match the contours and diameters of each of the tapered surfaces respectively to snugly, slidingly fit into each of the tapered surfaces of the head portion and router spindle.

In a specific embodiment, the second slot forms a fixed end disposed at an outer circumferentially spaced location from the center of the first slot. The outer circumferential distance between the center of the first slot and the second slot fixed end is effective to cause the inner circumferential tool grasping surface to grasp, under compressive force, the tool shaft or collet of a router tool whereby when the tightening member is tangentially tightened, it forms a tension force in the threaded tightener aperture in an amount effective to cause the tool grasping surface to apply a radially directed, grasping compressive force along and around substantially the entire outer circumferential surface of the tool shaft or collet received in the central bore.

The head portion includes a circumferential shoulder laterally spaced from the distal end surface to form a head thickness of the head portion The first slot extends inwardly from a distal end surface of the head portion parallel to the longitudinal axis of the bore, and for a distance greater than one-half of the head thickness between the distal end surface and the laterally spaced circumferential shoulder of the head portion. The second slot extends into the head portion orthogonally to the first slot from an outer circumferential surface of the head portion to define the bore-facing, tool grasping surface of the inner central bore, and terminates at a fixed end on the outer circumferential surface of the head portion at a location angle in a range of about 130° to about 160° circumferentially from the center of the first slot.

More specifically, the second slot terminates at a fixed end on the outer circumferential surface at a location angle of about 145° circumferentially from the center of the first slot, and the second slot is laterally spaced from the distal end surface in the range of about 0.375 to about 0.750 of an inch. The central bore accepts a tool shaft or collet having a standard diameter in the range of about 0.125 to about 0.750 inch with an overall outside diameter of the chuck head portion in the range of about 1.0 to about 1.5 inches.

In another embodiment, a chuck device for holding a tool having an unmodified, circumferentially round tool shaft or collet comprises a chuck body including an annular head portion having a distal end surface, a laterally spaced coupling end section, an outer circumferential surface, and a central longitudinally extending bore with an inner circumferential bore surface to slidingly receive the tool shaft or collet with the tool axis aligned collinearly with the bore axis. The head portion includes first and second slots that form a stationary segment and a pivotable segment having a bore-facing, tool grasping surface.

The first slot is located in a first plane that extends parallel to the bore axis from the distal end surface and through one side of the annular end head portion to intersect the inner bore surface and outer circumferential surface of the head portion. The second slot is located in a second plane that extends normal to the central bore axis and parallel to the distal end surface. The second plane is laterally spaced a distance from the distal end surface sufficient to allow a threaded aperture to extend into the stationary and pivotable segments, and a tightener member to be threadingly received in the threaded aperture that is tangentially disposed between inner and outer circumferential surfaces of the head portion, and between the distal end surface and the coupling end section. The second slot perpendicularly intersects the first slot to form the pivotable segment that causes the tool grasping surface to move between a rest position and a gripping position whereby the tool grasping surface radially directs a compressive grasping force around the outer unmodified, round surface of the tool shaft or collet received in the bore.

The tightener member, when tightened in the threaded aperture, is effective to produce a tension force in an amount sufficient to cause the tool grasping surface to grasp the tool shaft or collet received in the bore with a compressive force in an amount sufficient to hold the tool with a slip-torque of up to about 430 inch-lbs. at a rotational speed of up to at least about 20,000 rpm. The tightener aperture has a longitudinal axis that extends across the first slot, through the stationary and pivotable segments, and is effective to receive the tightener member having a head at one end thereof and a threaded portion at the distal end thereof to engage an inner threaded portion of at least one of the annular stationary and pivotable segments.

More specifically, the coupling end section includes connecting means for attaching the chuck device to a router spindle having outer threads and an inner tapered bore surface that converges into the spindle. The connecting means includes a tapered inner bore surface that diverges from the head portion to a cylindrical nut portion having inner threads to threadingly engage the outer threads of the router spindle. Axis alignment means for disposition between the tapered surfaces of the chuck device and tool spindle end, includes a split lock-washer, a collet having two ends and outer tapered surfaces that intersect at an intermediate point between the two ends. The outer tapered surfaces of the collet match the contours and diameters of each of the tapered surfaces respectively to snugly, slidingly fit into each of the tapered surfaces of the head portion and router spindle.

The second slot forms a fixed end disposed at an outer circumferentially spaced location from the center of the first slot. The outer circumferential distance between the center of the first slot and the second slot fixed end is effective to cause the inner circumferential tool grasping surface to grasp, under compressive force, the tool shaft or collet of a router tool whereby when the tightening member is tangentially tightened, it forms a tension force in an amount effective to cause the tool grasping surface to apply a radially directed compressive force along and around substantially the entire outer circumferential surface of the tool shaft or collet received in the central bore.

In a specific embodiment, the head portion includes a circumferential shoulder laterally spaced from the distal end surface to form a head thickness of the head portion. The first slot extends inwardly from a distal end surface of the head portion parallel to the longitudinal axis of the bore, and for a distance greater than one-half of the head thickness between the distal end surface and the laterally spaced circumferential shoulder of the head portion. The second slot extends into the head portion orthogonally to the first slot from an outer circumferential surface of the head portion to define the inner bore-facing, tool grasping surface of the inner central bore and terminates at a fixed end on the outer circumferential surface of the head portion at a location angle in a range of about 130° to about 160° circumferentially from the center of the first slot. More specifically, the second slot terminates at a fixed end on the outer circumferential surface at a location angle of about 145° circumferentially from the center of the first slot. The second slot is laterally spaced from the distal end surface in the range of about 0.375 to about 0.750 of an inch. The central bore accepts a tool shank or collet having a standard diameter in the range of about 0.125 to about 0.750 inch with an overall outside diameter of the chuck head portion in the range of about 1.0 to about 1.5 inches.

In another embodiment, a chuck device for holding a tool having an unmodified, circumferentially round tool shaft or collet comprises a chuck body including an annular head portion having a distal end surface, a laterally spaced coupling end section, an outer circumferential surface, and a central longitudinally extending bore with an inner circumferential surface to slidingly receive the tool shaft or collet with the tool axis aligned collinearly with the bore axis. The head portion includes a generally U-shaped, pivotally mounted arm having an inner curved bore-facing, tool grasping surface movable between a rest position and a gripping position whereby the tool grasping surface radially directs a compressive grasping force around the outer circumferential surface of the tool shaft or collet received in the bore.

A tightener member threadingly received in a threaded aperture is tangentially disposed between inner and outer circumferential surfaces of the head portion, and between the distal end surface and the laterally spaced coupling section of the head portion. The tightener member, when tightened, is effective to produce a tension force in an amount sufficient to cause the tool grasping surface to grasp the tool shaft or collet received in the bore in an amount of compressive force sufficient to hold the tool with a slip torque of up to about 430 inch-lbs. at a rotational speed of up to at least about 20,000 rpm. The tightener aperture has a longitudinal axis that extends through a stationary segment and into the pivotally mounted arm, and is effective to receive the tightener member having a head at one end thereof and a threaded portion at the distal end thereof to engage an inner threaded portion of the tightener aperture extending into the pivotally mounted arm. The central bore accepts a tool shaft or collet having a standard diameter in the range of about 0.125 to about 0.750 inch with an overall outside diameter of the chuck head portion in the range of about 1.0 to about 1.5 inches.

BRIEF DESCRIPTION OF THE DRAWINGS

FIG. 5 is a side elevational view of a further embodiment of the invention;

FIG. 6(a) is a side elevational view of yet another embodiment of the invention;

FIG. 6(b) is an end view, drawn to an enlarged scale, of the coupling portion of the chuck device of FIG. 6(a);

DESCRIPTION OF THE SPECIFIC EMBODIMENTS

Figure 1:
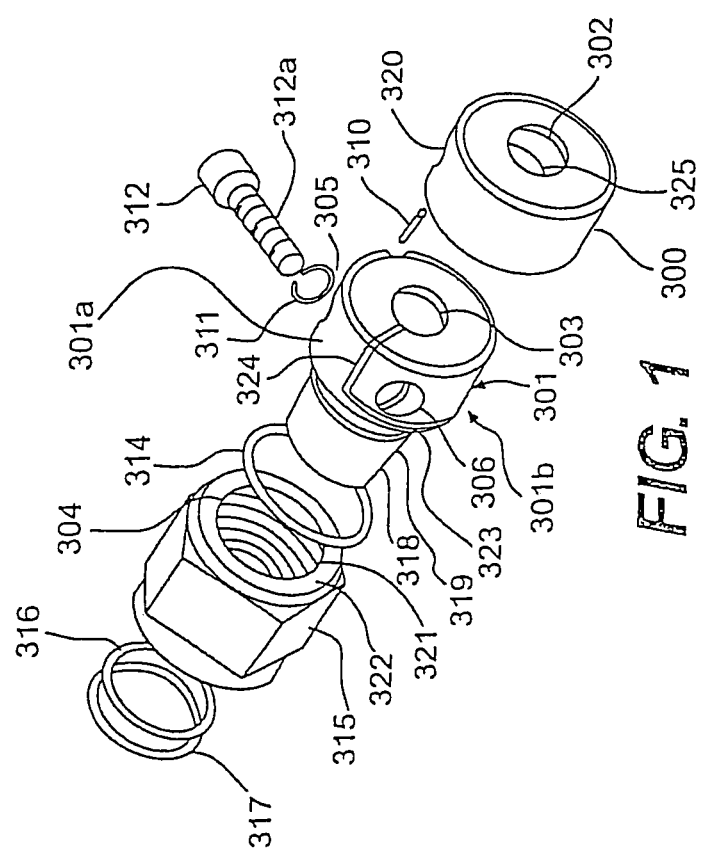
FIG. 1 is an exploded perspective view of a specific embodiment of a chuck assembly of the present invention.
Figure 2:
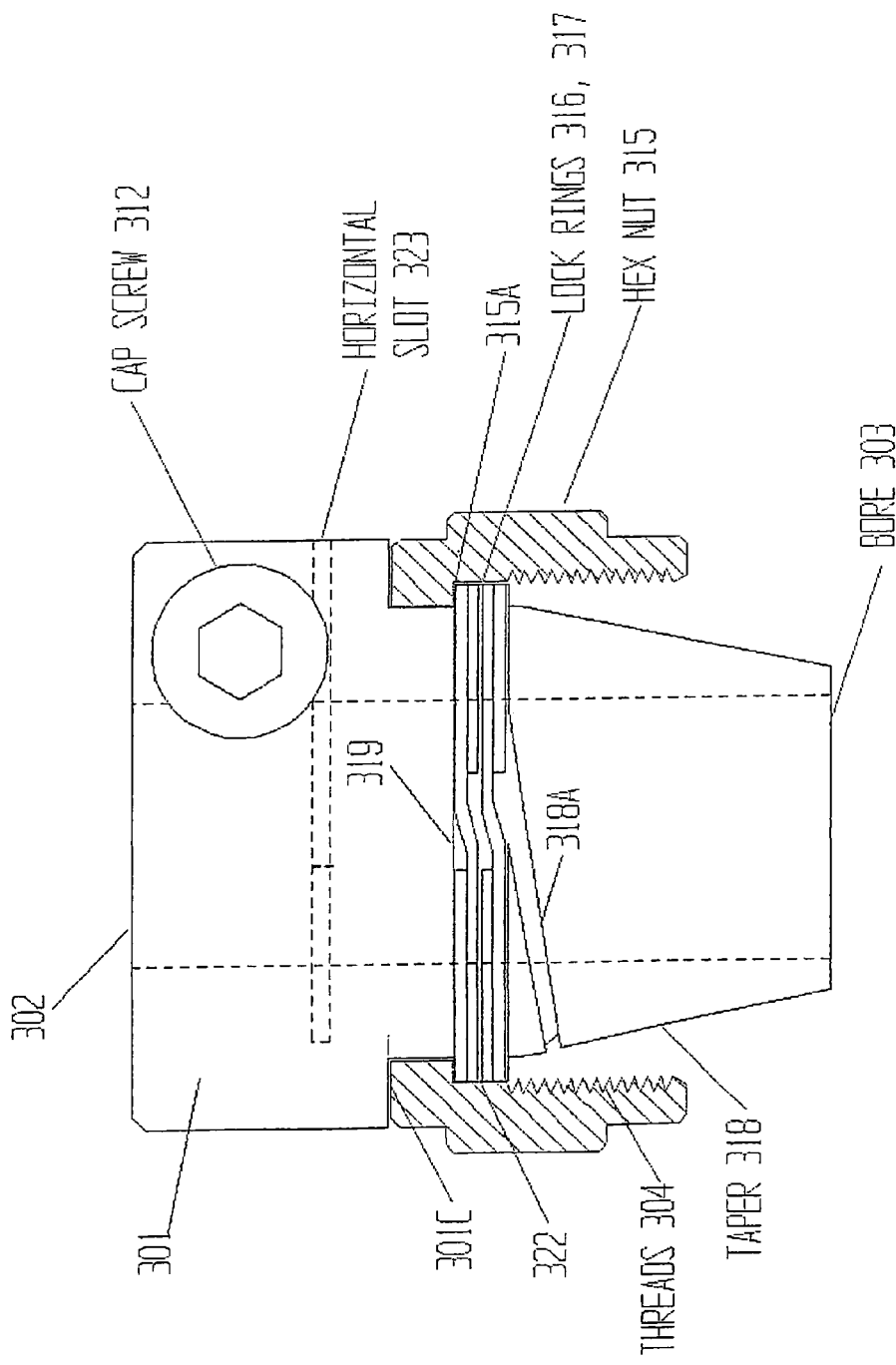
FIG. 2 is a side elevational view, partially in section, of a chuck body shown in accordance with the present invention.

FIG. 1 shows an exploded perspective view of a specific embodiment of the chuck device of the invention while FIGS. 2, 3(a) and 3(b) show various features of this embodiment. The chuck device is composed of nine parts as shown in FIG. 1, namely, a safety cover 300, a main body 301, a pin 310, a washer 311, a cap screw 312, a lock ring 314, a nut 315, and two further lock rings 316 and 317.

In accordance with a key feature of the invention, my chuck includes annular head portion 301 with first and second orthogonal slots 323 and 324 therein that divide head portion 301 into pivotable and fixed segments 301b and 301a that may be mechanically deformed by way of slots 323 and 324 best seen in FIGS. 3(a) and 3(b). First slot 324 extends inwardly from distal end surface 302 parallel to the axis of bore 303, and for a distance greater than one-half of the distance between distal end surface 302 and the bottom or shoulder 301c of head 301. Bore 303 has a diameter in the range of about 0.125 inch to 0.750 inch in diameter to accept an unmodified, round tool shaft or collet having a standard diameter in the range of about 0.125 to about 0.750 inch. The overall outside diameter of chuck head 301 is in the range of about 1.0 to 1.5 inches. The second slot is laterally spaced from the distal end surface in the range of about 0.375 to about 0.750 of an inch. In a specific embodiment, the diameter of bore 303 is about 0.5 inches and the diameter of head portion 301 is about 1.2 inches, and the second slot is laterally spaced from end surface 302 at about 0.375 inches.

As shown in FIG. 3(a), slot 323 extends inwardly from slot fixed end 323a on the circumferential side surface of body 301 and terminates generally along dashed line 323b that intersects its inner circumferential surface at 323c and orthogonal slot 324. Second slot 323 extends into intersecting first slot 324 from the outer circumferential side surface to define pivotable segment 301b having an inner circumferential, movable grasping surface of bore 303. Slot fixed end 323a is at a circumferential location in a range of about 130° to about 160° from the center of first slot 324. Pivotable segment 301b is capable of pivotable movement or flexing about slot fixed end 323a when tightening cap screw 312 with sufficient tension force against fixed side 301a. Inward movement of pivotable segment 301b produces a large clamping force to an unmodified, round tool shaft or collet (not shown) that may be inserted into bore 303.

Considering this clamping operation in more detail, body 301 includes tightener bore or aperture 305 having a longitudinal axis that extends across first slot 324, and through stationary and pivotable segments 301a and 301b. Tightener aperture 305 receives tightening bolt or cap screw 312 having a head at one end thereof and threaded portion 306 at the distal end thereof to engage its inner threads of at least one of stationary and pivotable segments 301a and 301b. Tightener aperture 305 is tangentially located between the inner and outer circumferential surfaces of head portion 301, and between distal end surface 302 and second slot 323.

When cap screw 312 is tightened, it pulls pivotable segment 301b against a tool shaft or collet (not shown) thereby exerting a large circumferential compressive force on the unmodified, round tool shank or collet. A large mechanical advantage is obtained by applying the tension force tangentially to cause segment 301b to pivotally move. The inner bore-facing surface of pivotable portion 301b engages substantially one-half of the outer surface of an unmodified, shaft or collet and compressive forces are applied around substantially the entire circumferential surface of the tool shaft to provide a noose effect. When cap screw 312 is loosened, pivotable segment 301b springs back to its relaxed or rest position thus freeing the tool to be removed. Cap screw 312 screws into the movable or pivotable segment from the fixed segment but it is understood that the cap screw (or other tightening element) can also screw into the fixed segment from the pivotable segment.

Referring to FIG. 2, chuck body 301 includes tapered coupling section 318 to ensure alignment of bore 303 with respect to the driven tool spindle (not shown). Constructional details of tapered section 318 will change according to requirements of the particular geometrical configuration of the driven tool spindle. For example, parameters such as the taper angle, diameter, and length will be made to match the configuration of the driven tool spindle.

To prepare for coupling chuck body 301 to a driven tool spindle involves placing nut 315 over tapered coupling section 318 and threading spiral locking rings 316 and 317 into spiral groove 318a and on into internal retaining groove 322 located inside of nut 315. Tapered section 318 is thus rotationally connected to nut 315, as shown in FIG. 2, by allowing locking rings 316 and 317 to expand and snap into circumferential groove 319 in tapered portion 318 thus permanently attaching nut 315 to the coupling end section that connects to the driven tool spindle.

Finally, tapered coupling portion 318 of the chuck is inserted into the driven tool spindle (not shown) and threads 304 located on the inside circumferential surface of nut 315 are tightened onto the outer threads of the spindle (not shown). When tightened onto the driven tool spindle, tapered section 318 is pulled against the matching spindle taper, thereby securing the chuck device to the spindle. After the chuck device has been installed onto the router or other spindle, the chuck device is ready to slidingly accept cutting tools and is otherwise ready for use.

Figure 4:
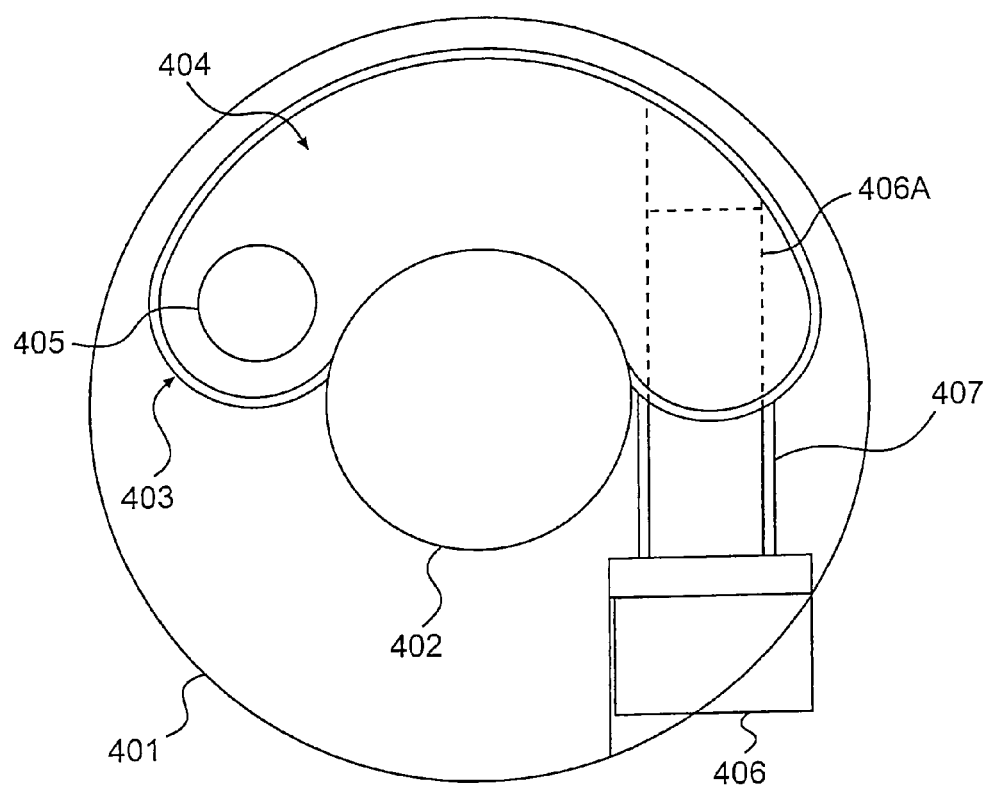
FIG. 4 is an end elevational view of the main body of an alternative embodiment for clamping of the tool bit in accordance with the present invention.

FIG. 4 shows an alternative embodiment of the invention that is similar to that of FIG. 1 and the description here will basically focus on the differences between this embodiment and that of FIG. 1. Main body 401 includes a conventional central bore 402, and milled cavity 403 that receives rotating or pivoting arm 404. Arm 404 pivots around pin 405 secured to main body 401 within cavity 403. Arm 404 is generally U-shaped, as shown, so that the inner curved surface thereof can engage the tool shank (not shown) that is to be slidingly received in bore 402. Cap screw 406 is placed in bore 407 and its threaded portion or section 406a threadingly engages a threaded aperture in the free end of arm 404. Cap screw 406 controls tightening and loosening of the engagement between the inner surface of arm 404 and the tool shank or collet (not shown).

Figure 9:
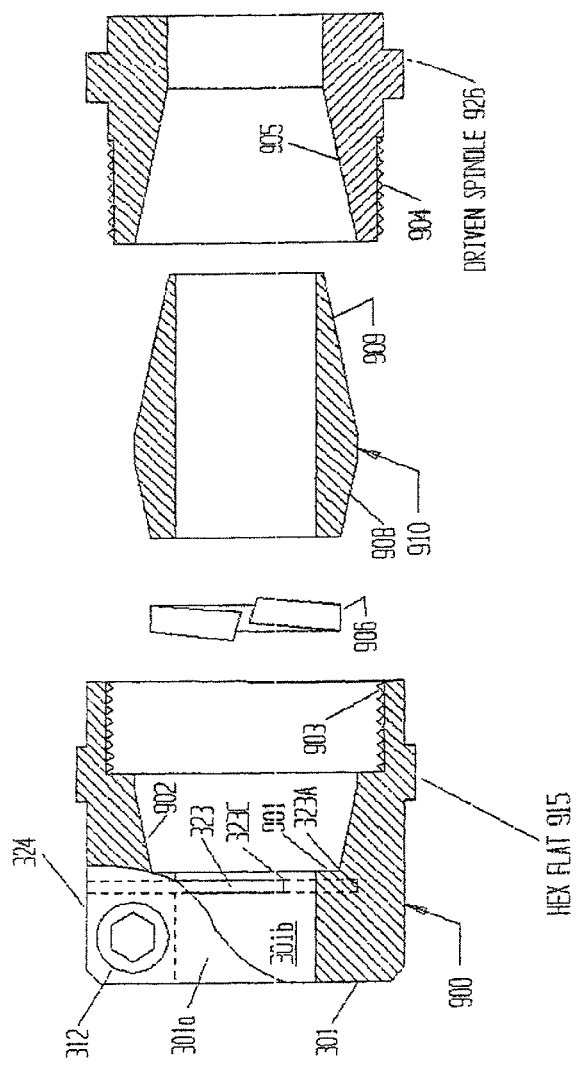
FIG. 9 is a fragmentary, exploded side elevational view of another embodiment of the invention with an alignment mechanism for attaching a chuck to a driven spindle.

The arrangement for mounting the chuck on the router shaft can be different from that illustrated in FIGS. 1 and 2. In an example, nut 315 including threads 304 may be formed as an integral part of main body 301, and tapered portion or section 318 of main body 301 may be a separate element forming a collet. Further, this separate collet can be of a double angle or double taper construction, such as shown in FIG. 9, rather than of a single taper construction shown in FIGS. 1 and 2. With this arrangement, the second taper of the separate collet would engage the abovementioned matching tapered inner wall of the router spindle (not shown). Of course, one or more lock washers, corresponding to lock washers 316 and 317, would be used in a similar manner to lock washers 316 and 317 between the integrally formed nut and separate tapered collet.

Figure 3:
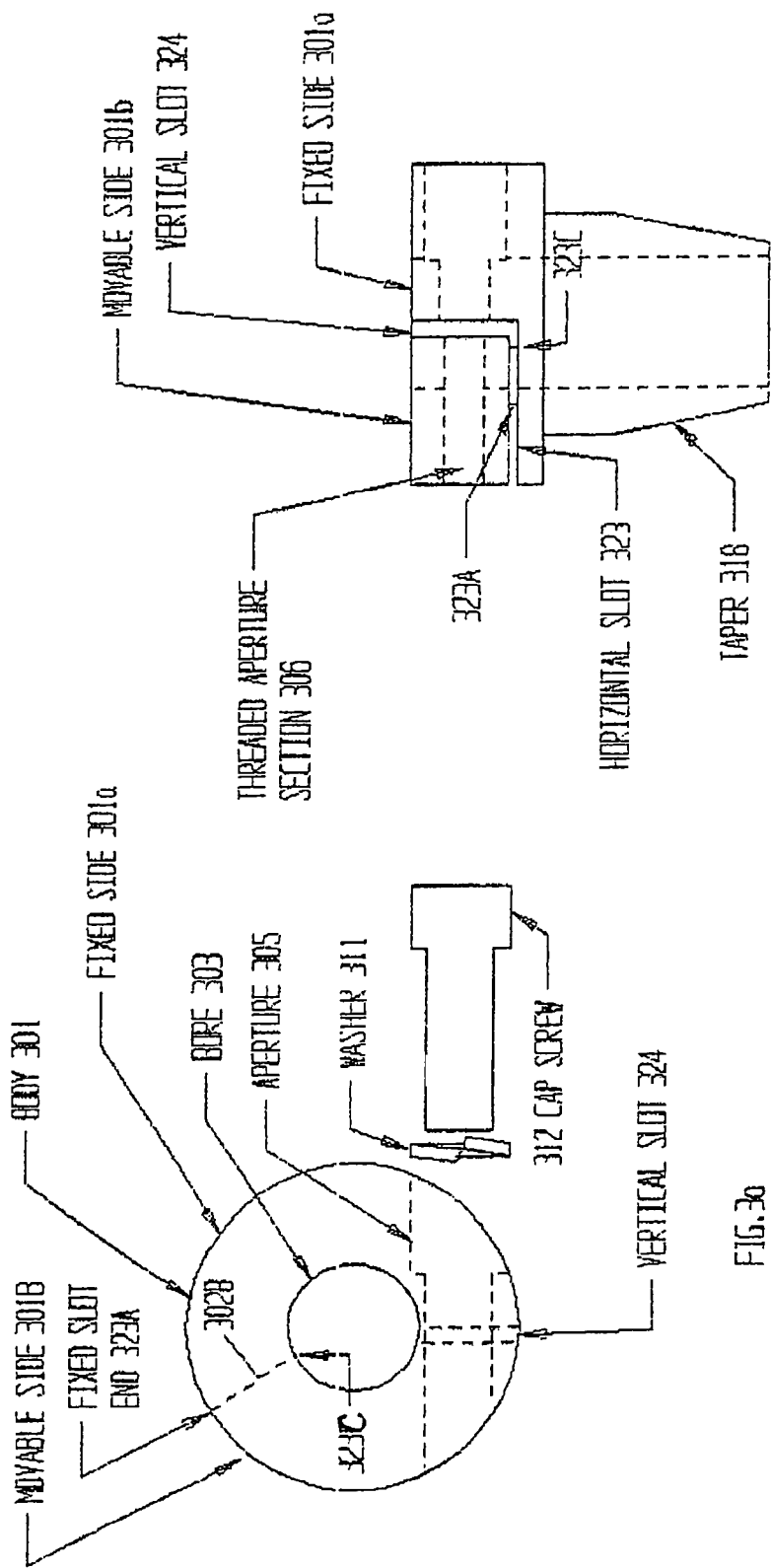
FIG. 3(a) is an exploded, end elevational view of slots in the main chuck body shown in accordance with the present invention.
FIG. 3(b) is a side elevational view showing slots (without a cap screw in the main body) that allow clamping of a tool bit in accordance with the present invention.

FIG. 5 shows another embodiment in which chuck 500 includes head portion 502 having stationary and pivotable segments constructed in the same way as the distal end head portion of main body 301 of FIGS. 1, 2, 3(*a*) and 3(*b*). Because of this similarity, corresponding elements of head portion 502 have been given the same reference numerals and include central bore 303, orthogonal slots 323 and 324, and transverse aperture 305 adapted to receive cap screw 312 (not shown). Fixed slot end 323*a* and inner slot end 323*c* are also shown. Construction of head portion 502 is otherwise as described above and will not be described further. Moreover, it will be understood that head portion 502 could also be of the construction shown in FIG. 4.

In the embodiment of FIG. 5, proximal end portion of 504 of chuck 500 comprises a simple male shaft 506 that slides into a collet (not shown) of an associated router (not shown) having a coupling assembly that is adapted to receive a male shaft. Thus, the basic difference between this embodiment and those described above concerns the provision of the simple male shaft 506 in place of the connecting assembly described previously.

FIGS. 6(*a*) and 6(*b*) show a further embodiment in which chuck 600 is constructed with head portion 602 that is similar to that of the embodiment of FIGS. 1 and 2. So like reference numerals are used, and this embodiment will only be described relative to the differences.

Proximal end 604 includes coupling portion 606 and bore 303 which includes counterbore 608 for receiving connecting bolt 610. This embodiment is adapted to couple to routers (not shown) that include an upstanding or outwardly extending coupling element (not shown) that would be received in slot 612 in the end of coupling portion 606. Bolt 610 secures chuck 600 to this coupling element (not shown) of the associated router (not shown).

FIG. 6(*b*) is drawn to an enlarged scale, and is an end view of coupling portion 606 of FIG. 6(*a*), slot 612 has a width equal to that of the aforementioned outwardly extending coupling spindle (not shown) of the router, and equal to the diameter of the lower portion of counterbore 608. Thus, this construction acts as a spline that prevents relative rotation between chuck 600 and the router spindle. It is also understood that while a female-male coupling is described, the coupling could also be male-female with the male member on coupling portion 606 and the router having the female member. Other kinds of conventional rotation-preventing couplings of different shapes (polygonal, circular, etc) may also be employed for this purpose.

Figure 7:
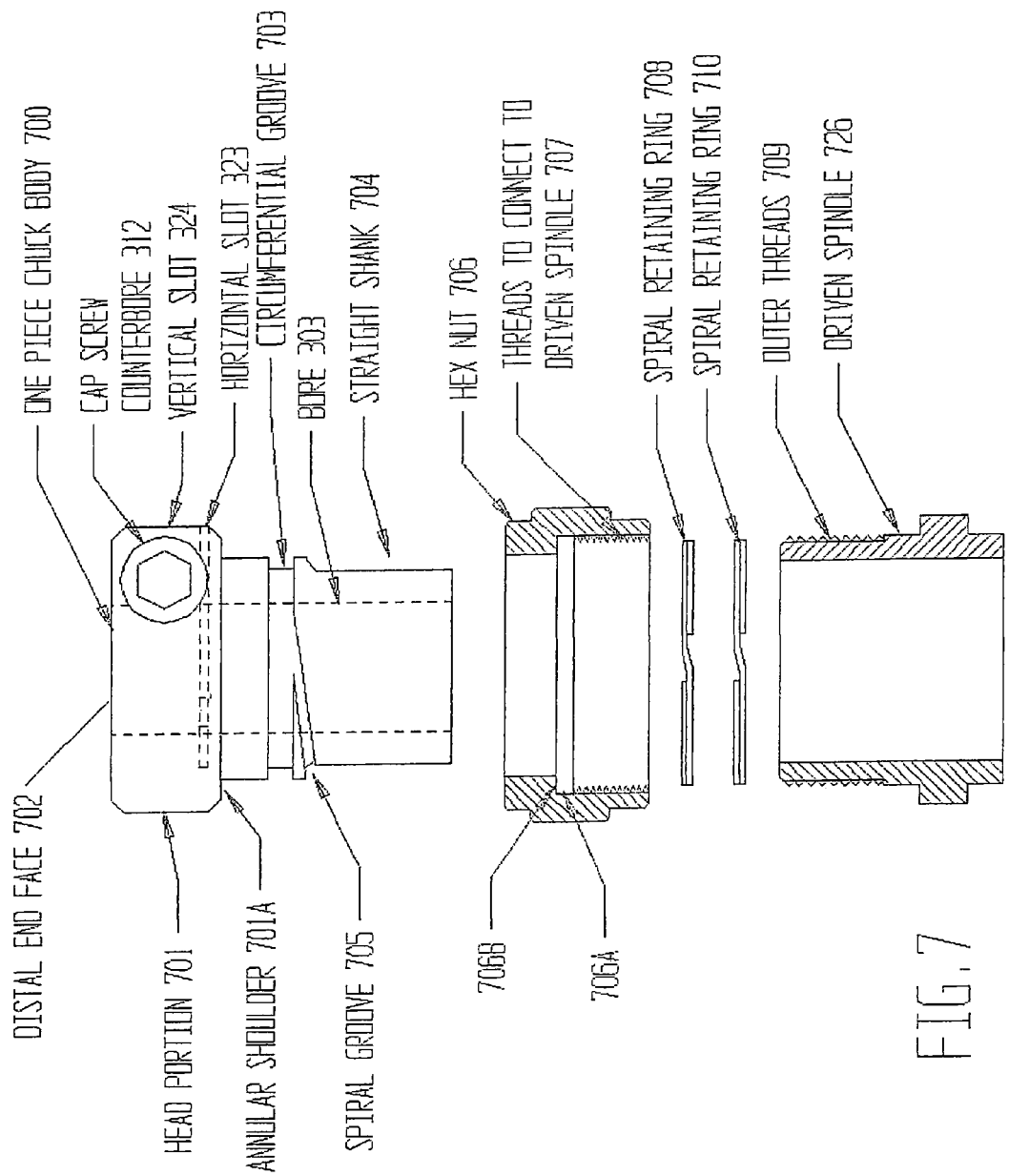
FIG. 7 is an exploded side elevational view of still another embodiment of the invention.

FIG. 7 shows an embodiment in which chuck 700 is similar to that of FIGS. 1 and 2 except proximal portion 704 is cylindrical rather than tapered. Distal end surface 702 and shoulder 701*a* define the limits on head 701 having horizontal slot 323 located greater than half the distance between surface 702 and shoulder 701*a* at the bottom of head 701. To assemble, nut 706 is disposed against annular shoulder 701*a* and spiral retaining rings 708 and 710 are screwed into internal retaining groove 706*a* via spiral groove 705 against shoulder 706*b* of nut 706. Once nut 706 is in place, retaining groove 706*a* is aligned with circumferential groove 703 to permanently fix head 701 to nut 706. Threads 707 of nut 706 may then be threadingly engaged with threads 709 of driven spindle 726 of a router.

Figure 8:
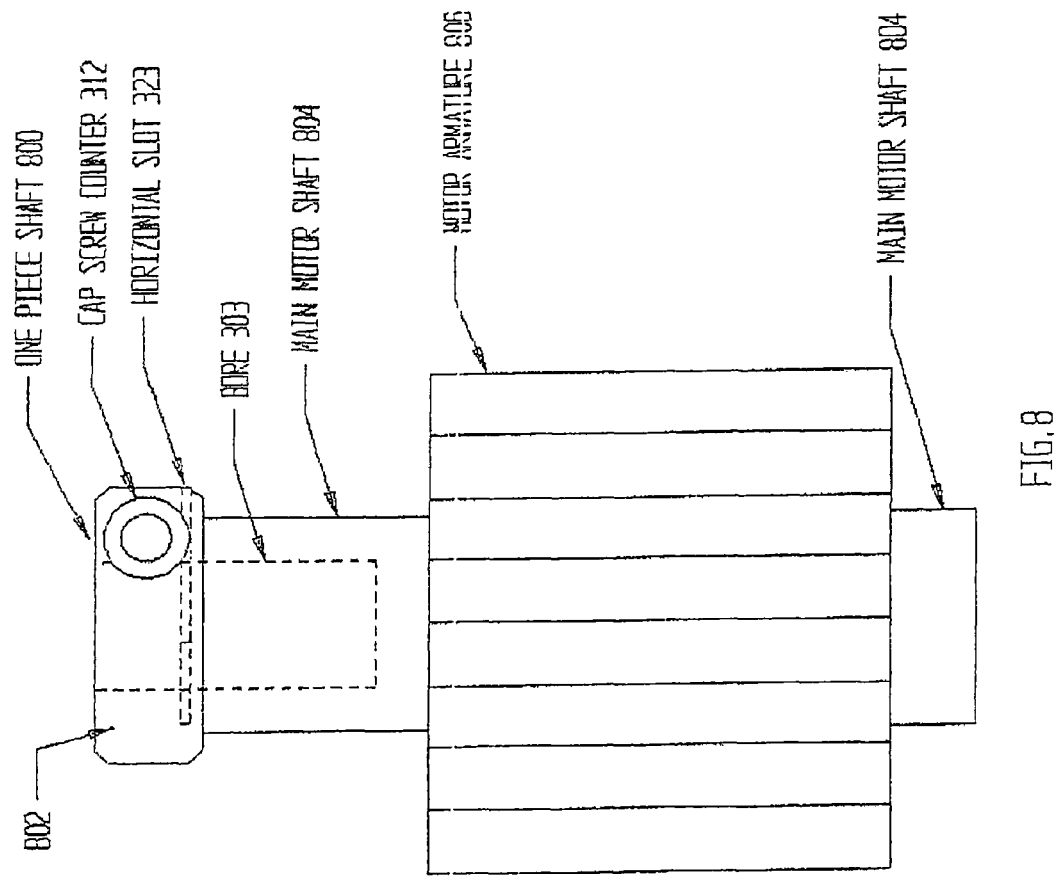
FIG. 8 is a side elevational view of a further embodiment of the invention.

FIG. 8 shows chuck 800 in accordance with a further embodiment of the invention. Head portion 802 of chuck 800 is again the same as described above and will not be described further. This embodiment is distinguished by the fact that chuck 800 is formed integrally with main motor shaft 804 of a router, with shaft 804 having an associated electrical armature 806 affixed or attached thereto. A number of commercial routers include this type main motor shaft of a shop router such as Model No. 0601617739 made by Bosch Industrial. Thus, in this embodiment, the router (not shown) is made with the integral chuck 800, i.e., the chuck 800 is not a separate unit as in the other embodiments.

The fragmentary, exploded view of FIG. 9 shows axis alignment means for disposition between the tapered surfaces of chuck 900 and the end of tool spindle 926, and includes split lock washer 906, collet 910 having two ends and outer tapered surfaces 908 and 909 that intersect at an intermediate point between the two collet ends. Coupling end section 915 includes connecting means for attaching chuck 900 to router spindle 926 having outer threads 904 and inner tapered bore surface 905 that converges into spindle 926. Chuck 900 includes tapered inner bore surface 902 that diverges from head portion 301 to a cylindrical nut portion 915 having inner threads 903 to threadingly engage router spindle outer threads 904. Outer tapered surfaces 908 and 909 match the contours and diameters of each respective tapered surface 902 and 905 to snugly, slidingly fit into each of the tapered surfaces of the head portion and router spindle.

More specifically, head portion 301 includes slots 323 outer slot fixed end 323*a* and inner fixed end 323*c* and vertical slot 324 forming stationary and pivotable segments 301*a* and 301*b*, with cap screw 312, that operate as in the previous embodiments. Chuck 900 includes tapered inner bore 902 forming shoulder 901 against which spilt lock washer 906 rests. Double tapered collet 910 has a first taper portion 908 to be disposed within inner tapered bore 902 of chuck 900 against lock washer 906, and a second taper portion 908 to be disposed within tapered inner bore 902 of driven spindle 926. Inner threads 903 of chuck 900 threadingly engage outer threads 904 of driven spindle 926 and tightened together using flats of hex nut 915. Any misalignment between chuck 900 coupled to driven spindle 926 caused by engaged threads 903 and 904 when coupled to spindle 926 is corrected when the double tapered collet 910 is tightened in place.

Figure 10:
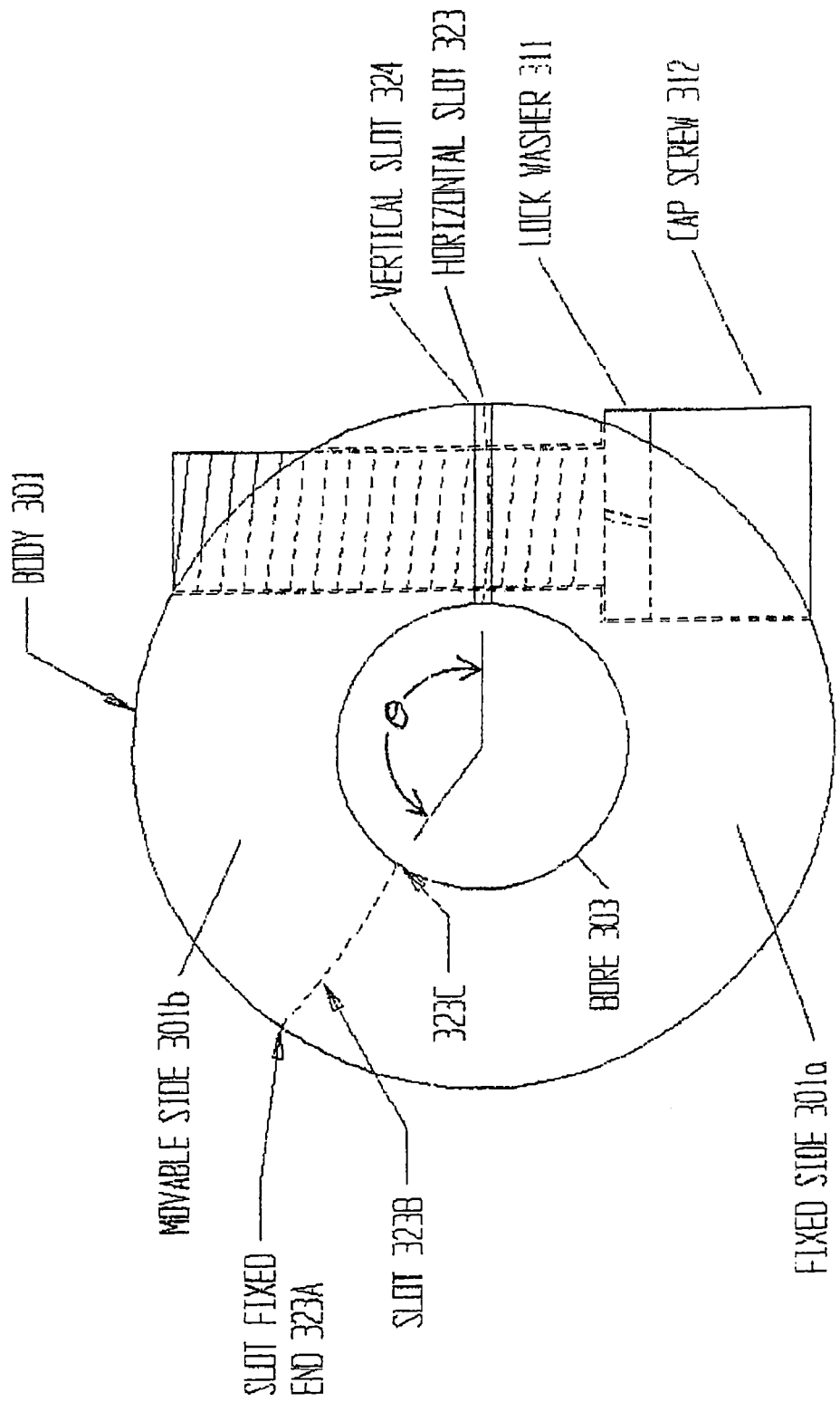
FIG. 10 is a top view of a chuck of the invention showing the disposition of the second slot according to the invention.

The top end view of FIG. 10 shows chuck body 301 of each of the foregoing embodiments having a critical disposition of slots 323 and 324 that form stationary segment 301*a* and movable or pivotable segment 301*b* with respect to cap screw 312 and lock washer 311. The dashed line 323*b* extends between slot fixed outer end 323*a* and inner end 323*c* on circumferential surface of bore 303. Angle theta (θ) measures the approximate angular, outer circumferential distance between the center of slot 324 to the circumferential location of slot fixed end 323*a* and is in the range of about 130° to about 160°. In a specific embodiment, the angular location is about 145°.

Figure 11:
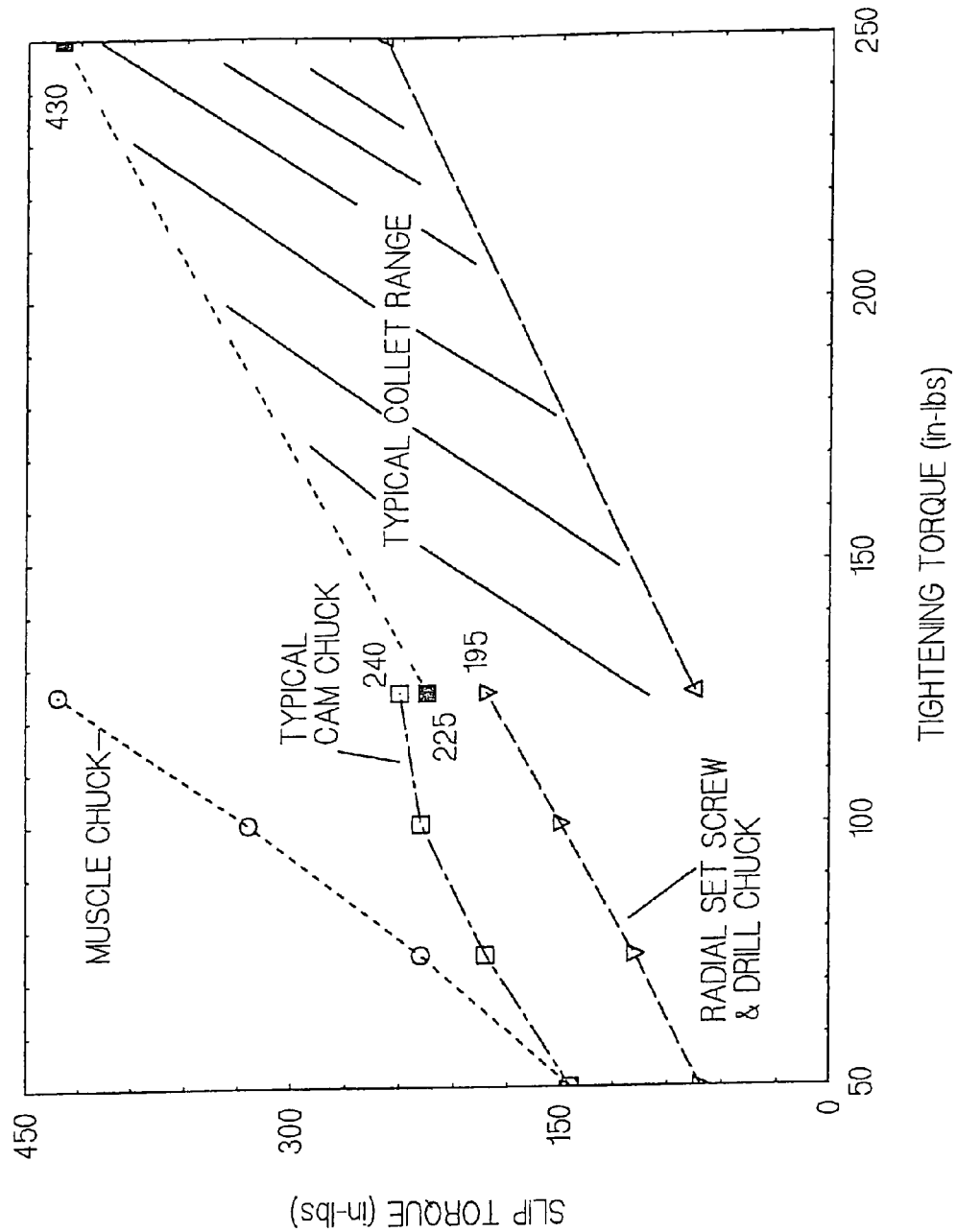
FIG. 11 is a graph of a slip comparison of my invention, the Musclechuck™, with other prior art tool holding devices.

FIG. 11 is a graph showing new and unexpected results from my chuck in a slip comparison between other devices for holding the shafts of tools. Tightening torque is a measure of the amount of torque, in inch-lbs., used to tighten a tool in a router spindle using cams or collets, and in a drill using radial set screws to hold the tool shaft in place. Slip-torque is a measure of the amount of torque, in inch-lbs., required to rotate an unmodified, round shaft that has been tightened in place within the bore of the router or drill. Certified torque measuring wrenches were used to determine the slip-torques results for each of the tightening torque measurements.

A test shaft composed tool steel having a Rockwell hardness of 60/62, was placed in the bore of holding devices, namely, a) a radial set screw, b) typical point contact cam chuck device, c) a collet with a threaded nut, and d) my circumferential tool shaft grasping device. The slip-torque is plotted against the tightening torque for each of the different types of holding devices. At a tightening torque of about 120 inch-lbs., the slip torque for the radial set screw type holder is about 195 inch-lbs., and for the typical point contact cam chuck device is about 240 inch-lbs. Collets tightened in 360° with a threaded nut comes in many sizes and the results are presented in a typical collet range of slip-torques a maximum of from about 225 inch-lbs. at a tightening torque of 120 inch-lbs. to a slip-torque of about 430 inch-lbs. at a tightening torque of about 250 inch-lbs.

Unexpectedly, my chuck, compared with a range of typical collets, when tightened to about 120 inch-lbs., will maintain a slip-torque of from about 2 to about 7 times that of a typical collet that did not attain a maximum slip-torque of about 430 inch-lbs., compared to my chuck, until it used twice the amount of tightening torque. At a tightening torque of 120 inch-lbs. the cam chuck device began to mechanically fail and reached a maximum slip-torque of about 240 inch-lbs. Unexpectedly, my chuck outperformed the cam chuck device by almost twice the amount of slip-torque attained at a tightening torque of about 120 inch-lbs. These new and unexpected results achieved by my device prove to be a significant advance in the tool holding industry.

Although the invention has been described above in relation to specific embodiments thereof, it will be understood by those skilled in the art that variations and modifications can be effected in these specific embodiments without departing from the scope and spirit of the invention.

What I claim is:

1. A chuck device for holding a tool having a circumferentially round tool shaft or collet, the device comprising:
    a) a chuck body including an annular head portion having a distal end surface, a laterally spaced coupling end section, an outer circumferential surface, and a central longitudinally extending bore with an inner circumferential bore surface to slidingly receive the tool shaft or collet with the tool axis aligned collinearly with the bore axis;
    b) the head portion including a first slot extending inwardly on one side of the annular head and normal to the distal end surface, and a second slot extending from the outer circumferential surface normal to and intersecting the first slot to form a stationary segment and a pivotable segment having a bore-facing, tool grasping surface that moves between a rest position and a gripping position whereby the tool grasping surface radially directs a compressive grasping force around the outer circumferential surface of the tool shaft or collet received in the bore; and
    c) the second slot being parallel to and laterally spaced a distance from the distal end surface sufficient to allow a threaded aperture to extend into the stationary and pivotable segments, and a tightener member to be threadingly received in the threaded aperture that is tangentially disposed between inner and outer circumferential surfaces of the head portion, and between the distal end surface and the second slot;
    d) the tightener member, when tightened in the threaded aperture, is effective to produce a tension force in an amount sufficient to cause the tool grasping surface to grasp the tool shaft or collet received in the bore with a compressive force in an amount sufficient to hold the tool with a slip-torque of up to about 430 inch-lbs at a rotational speed of up to at least about 20,000 rpm.

2. A chuck device as defined in claim 1, wherein
the first slot is located in a first plane that extends parallel to the bore axis from the distal end surface and through one side of the annular end head portion to intersect the inner bore surface and the outer circumferential surface of the head portion;
the second slot is located within a second plane that extends normal to the central bore axis, is laterally spaced from and parallel to the distal end surface, and perpendicularly intersects the first slot to form the pivotable segment.

3. A chuck device as defined in claim 2, wherein
the tightener aperture has a longitudinal axis that extends across the first slot, through the stationary and pivotable segments, and is effective to receive the tightener member having a head at one end thereof and a threaded portion at the distal end thereof to engage an inner threaded portion of at least one of the annular stationary and pivotable segments.

4. A chuck device as defined in claim 3, wherein
the coupling end section includes connecting means for attaching the chuck device to a router spindle having outer threads and an inner tapered bore surface that converges into the spindle;
the connecting means includes a tapered inner bore surface that diverges from the head portion to a cylindrical nut portion having inner threads to threadingly engage the outer threads of the router spindle; and
axis alignment means for disposition between the tapered surfaces of the chuck device and tool spindle end includes a split lock washer, a collet having two ends and outer tapered surfaces that intersect at an intermediate point between the two ends;
said outer tapered surfaces of the collet match the contours and diameters of each of the tapered surfaces respectively to snugly, slidingly fit into each of the tapered surfaces of the head portion and router spindle.

5. A chuck device as defined in claim 1, wherein
the second slot forms a fixed end disposed at an outer circumferentially spaced location from the center of the first slot;
the outer circumferential distance between the center of the first slot and the second slot fixed end is effective to cause the inner circumferential grasping surface to grasp, under compressive force, the tool shaft or collet of a router tool;
whereby when the tightening member is tangentially tightened, it forms a tension force in the threaded tightener aperture in an amount effective to cause the tool grasping surface to apply a radially directed, grasping compressive force along and around substantially the entire outer circumferential surface of the tool shaft or collet received in the central bore.

6. A chuck device as defined in claim 1, wherein
the head portion includes a circumferential shoulder laterally spaced from the distal end surface to form a head thickness of the head portion, and the first slot extends inwardly parallel to the longitudinal axis of the bore and for a distance greater than one-half of the head thickness between the distal end surface and the laterally spaced circumferential shoulder of the head portion;
the second slot extends into the head portion orthogonally to the first slot from an outer circumferential surface of the head portion to define the bore-facing, tool grasping surface of the inner central bore;
the second slot terminates at a fixed end on the outer circumferential surface of the head portion at a location angle in a range of about 130° to about 160° circumferentially from the center of the first slot.

7. A chuck device as defined in claim 6, wherein
the second slot terminates at a fixed end on the outer circumferential surface at a location angle of about 145° circumferentially from the center of the first slot.

8. A chuck device as defined in claim 1, wherein
the second slot is laterally spaced from the distal end surface in the range of about ⅜ to about ¾ of an inch.

9. A chuck device as defined in claim 1, wherein
the central bore accepts a tool shaft or collet having a standard diameter in the range of about ⅛ to about ¾ inch with an overall outside diameter of the chuck head portion in the range of about 1 to about 1½ inches.

10. A chuck device for holding a tool having a circumferentially round tool shaft or collet, the device comprising:
a) a chuck body including an annular head portion having a distal end surface, a laterally spaced coupling end section and circumferential shoulder, an outer circumferential surface, and a central longitudinally extending bore with an inner circumferential bore surface to slidingly receive the tool shaft or collet with the tool axis aligned collinearly with the bore axis;
b) the head portion including first and second slots that form a stationary segment and a pivotable segment having a bore-facing, tool grasping surface;
c) the first slot is located in a first plane that extends parallel to the bore axis from the distal end surface and through one side of the annular end head portion to intersect the inner bore surface and outer circumferential surface of the head portion;
d) the second slot is located in a second plane that extends normal to the central bore axis, is laterally spaced from and parallel to the distal end surface, and perpendicularly intersects the first slot to form the pivotable segment that causes the tool grasping surface to move between a rest position and a gripping position;
e) whereby the tool grasping surface radially directs a compressive grasping force around the outer circumferential surface of the tool shaft or collet received in the bore; and
f) a threaded aperture extending into the stationary and pivotable segments, and a tightener member is threadingly received in the threaded aperture that is tangentially disposed between inner and outer circumferential surfaces of the head portion, and between the distal end surface and the second slot;
g) the tightener member, when tightened in the threaded aperture, is effective to produce a tension force in an amount sufficient to cause the tool grasping surface to grasp the tool shaft or collet received in the bore with a compressive force in an amount sufficient to hold the tool with a slip-torque of up to about 430 inch-lbs at a rotational speed of up to at least about 20,000 rpm.

11. A chuck device as defined in claim 10, wherein
the tightener aperture has a longitudinal axis that extends across the first slot, through the stationary and pivotable segments, and is effective to receive the tightener member having a head at one end thereof and a threaded portion at the distal end thereof to engage an inner threaded portion of at least one of the annular stationary and pivotable segments.

12. A chuck device as defined in claim 10, wherein
the coupling end section includes connecting means for attaching the chuck device to a router spindle having outer threads and an inner tapered bore surface that converges into the spindle;
the connecting means includes a tapered inner bore surface that diverges from the head portion to a cylindrical nut portion having inner threads to threadingly engage the outer threads of the router spindle; and
axis alignment means for disposition between the tapered surfaces of the chuck device and tool spindle end, includes a split lock washer, a collet having two ends and outer tapered surfaces that intersect at an intermediate point between the two ends;
said outer tapered surfaces of the collet match the contours and diameters of each of the tapered surfaces respectively to snugly, slidingly fit into each of the tapered surfaces of the head portion and router spindle.

13. A chuck device as defined in claim 11, wherein
the second slot forms a fixed end disposed at an outer circumferentially spaced location from the center of the first slot;
the outer circumferential distance between the center of the first slot and the second slot fixed end is effective to cause the inner circumferential tool grasping surface to grasp, under compressive force, the tool shaft or collet of a router tool;
whereby when the tightening member is tangentially tightened it forms a tension force in the threaded tightener aperture in an amount effective to cause the tool grasping surface to apply a radially directed compressive force along and around substantially the entire outer circumferential surface of the tool shaft or collet received in the central bore.

14. A chuck device as defined in claim 10, wherein
the first slot extends inwardly from a distal end surface of the head portion parallel to the longitudinal axis of the bore, and for a distance greater than one-half of the head thickness between the distal end surface and the laterally spaced circumferential shoulder of the head portion;
the second slot extends into the head portion orthogonally to the first slot from an outer circumferential surface of the head portion to define the inner bore-facing, tool grasping surface of the inner central bore;
the second slot terminates at a fixed end on the outer circumferential surface of the head portion at a location angle in a range of about 130° to about 160° circumferentially from the center of the first slot.

15. A chuck device as defined in claim 14, wherein
the second slot terminates at a fixed end on the outer circumferential surface at a location angle of about 145° circumferentially from the center of the first slot.

16. A chuck device as defined in claim 10, wherein
the second slot is laterally spaced from the distal end surface in the range of about ⅜ to about ⅜ of an inch.

17. A chuck device as defined in claim 10, wherein
the central bore accepts a tool shaft or collet having a standard diameter in the range of about ⅛ to about ¾ inch with an overall outside diameter of the chuck head portion in the range of about 1 to about 1½ inches.

18. A chuck device for holding a tool having a circumferentially round tool shaft or collet, the device comprising:
a) a chuck body including an annular head portion having a distal end surface, a laterally spaced coupling end section, an outer circumferential surface, and a central longitudinally extending bore with an inner circumferential surface to slidingly receive the tool shaft or collet with the tool axis aligned collinearly with the bore axis;
b) the head portion including a generally U-shaped, pivotally mounted arm having an inner curved bore-facing, tool grasping surface movable between a rest position and a gripping position whereby the tool grasping surface radially directs a compressive grasping force around the outer circumferential surface of the tool shaft or collet received in the bore; and c) a tightener member is threadingly received in a threaded aperture tangentially disposed between inner and outer circumferential surfaces of the head portion, and between the distal end surface and the laterally spaced coupling section of the head portion;

d) the tightener member, when tightened, being effective to produce a tension force in an amount sufficient to cause the tool grasping surface to grasp the tool shaft or collet received in the bore in an amount of compressive force sufficient to hold the tool with a slip torque of up to about 430 inch-lbs at a rotational speed of up to at least about 20,000 rpm.

19. A chuck device as defined in claim 18, wherein the tightener aperture has a longitudinal axis that extends through a stationary segment and into the pivotally mounted arm, and is effective to receive the tightener member having a head at one end thereof and a threaded portion at the distal end thereof to engage an inner threaded portion of the tightener aperture extending into the pivotally mounted arm.

20. A chuck device as defined in claim 18, wherein the central bore accepts a tool shaft or collet having a standard diameter in the range of about ⅛ to about ¾ inch with an overall outside diameter of the chuck head portion in the range of about 1 to about 1½ inches.

* * * * *